US008830216B2

(12) United States Patent
Araki

(10) Patent No.: US 8,830,216 B2
(45) Date of Patent: Sep. 9, 2014

(54) ILLUMINANCE DETECTION METHOD, FLIP-TYPE ELECTRONIC DEVICE AND PROGRAM

(75) Inventor: Daisuke Araki, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/144,485

(22) PCT Filed: Jan. 15, 2010

(86) PCT No.: PCT/JP2010/050746
§ 371 (c)(1), (2), (4) Date: Jul. 13, 2011

(87) PCT Pub. No.: WO2010/084932
PCT Pub. Date: Jul. 29, 2010

(65) Prior Publication Data

US 2011/0273414 A1 Nov. 10, 2011

(30) Foreign Application Priority Data

Jan. 21, 2009 (JP) ................................ 2009-011106

(51) Int. Cl.

| | |
|---|---|
| ***G06F 3/038*** | (2013.01) |
| *H04W 52/02* | (2009.01) |
| *H04M 1/02* | (2006.01) |
| *H04M 1/22* | (2006.01) |

(52) U.S. Cl.
CPC .......... *H04M 1/0245* (2013.01); *H04W 52/027* (2013.01); *H04M 2250/12* (2013.01); *H04M 1/0214* (2013.01); *H04M 1/22* (2013.01)
USPC .......................................... 345/207; 345/102

(58) Field of Classification Search
USPC ................ 345/102, 161, 207, 1.1; 348/14.02
See application file for complete search history.

(56) References Cited

U.S. PATENT DOCUMENTS

| | | | | |
|---|---|---|---|---|
| 6,373,397 | B1 * | 4/2002 | Song | 340/815.4 |
| 7,605,801 | B1 * | 10/2009 | Sharp | 345/161 |
| 2005/0030518 | A1 * | 2/2005 | Nishi et al. | 356/3.04 |
| 2008/0165115 | A1 | 7/2008 | Herz et al. | |
| 2008/0165116 | A1 * | 7/2008 | Herz et al. | 345/102 |

FOREIGN PATENT DOCUMENTS

| | | | |
|---|---|---|---|
| CN | 1764829 | A | 4/2006 |
| CN | 2817238 | Y | 9/2006 |
| CN | 101179789 | A | 5/2008 |
| JP | 2001265463 | A | 9/2001 |
| JP | 2005012609 | A | 1/2005 |

(Continued)

OTHER PUBLICATIONS

International Search Report for PCT/JP2010/050746 mailed Feb. 16, 2010.

(Continued)

*Primary Examiner* — Andrew Sasinowski
(74) *Attorney, Agent, or Firm* — Sughrue Mion, PLLC

(57) ABSTRACT

For solving a problem that it cannot measure illuminance level around user interface correctly, an illuminance detection method includes a first step of detecting an open operation of a flip-type electronic device having the user interface located at an inner side in a closed state, and a second step of measuring illuminance level in a vicinity of an area where the user interface is exposed in an opened state of the flip-type electronic device when the open operation is detected.

14 Claims, 14 Drawing Sheets

(56) References Cited

FOREIGN PATENT DOCUMENTS

| | | | |
|---|---|---|---|
| JP | 2007186220 | A | 7/2007 |
| JP | 2007215206 | A | 8/2007 |
| JP | 2007251788 | A | 9/2007 |
| JP | 2008166972 | A | 7/2008 |
| JP | 2008219659 | A | 9/2008 |
| JP | 2008263271 | A | 10/2008 |
| WO | 2008032374 | A | 3/2008 |

OTHER PUBLICATIONS

Chinese Office Action for CAN201080005201.0 issued on Mar. 4, 2013 with English Translation.

Chinese Office Action for CN Application No. 2010800005201.0 issued on Nov. 26, 2013 with English Translation.

* cited by examiner

CLOSED STATE

OPENED STATE

CLOSED STATE

OPENED STATE

ILLUMINANCE DETECTION METHOD, FLIP-TYPE ELECTRONIC DEVICE AND PROGRAM

This application is the National Phase of PCT/JP2010/050746 , filed Jan. 15, 2010 , which claims priority from Japanese Patent Application No. 2009-011106, filed on Jan. 21,2009 , the contents of which are incorporation herein by reference in their entirety.

TECHNICAL FIELD

The present invention relates to detection of ambient illuminance level of an electronic device. In particular, the present invention relates to an illuminance detection method of a flip-type electronic device, the flip-type electronic device and a program.

BACKGROUND ART

A mobile terminal is equipped with a backlight for illuminating keys or the like at a key pad part or the like which becomes user interface so that a user can distinguish a key position even in a dark place. It is not necessary to let this backlight light up in an originally bright use environment, but also it consumes wasteful electric power when let it light up.

For this reason, it is considered to prevent consumption of the wasteful electric power by using a mobile terminal equipped with an illuminance sensor (an optical sensor). That is, the illuminance sensor detects illuminance level in a use environment of the mobile terminal by the user. And, the mobile terminal suppresses the power consumption according to the detected illuminance level by turning off the light or making the luminance low when the backlight is unnecessary.

FIG. 12 is a drawing showing an external appearance of a flip-type mobile terminal as related art of the present invention. As shown in FIG. 12, in the flip-type mobile terminal, it is general to arrange the illuminance sensor for controlling a backlight at an inner face of the flip-type housing. Such a flip-type mobile terminal is disclosed by Japanese Patent Application Laid-Open No. 2008-263271, for example. Also, the relating mobile terminals are disclosed in Japanese Patent Application Laid-Open No. 2005-012609, Japanese Patent Application Laid-Open No. 2008-219659, Japanese Patent Application Laid-Open No. 2008-166972 and Japanese Patent Application No. 2007-186220.

DISCLOSURE OF THE INVENTION

Problem to be Solved by the Invention

As mentioned above, in order to discriminate lighting up/non-lighting up, or right and wrong of the luminance of the backlight needed by the user, the illuminance sensor installed in a flip-type mobile terminal is arranged near user interface in a state that the flip-type mobile terminal is being used by the user. The illuminance sensor measures illuminance level around the arranged position.

However, in these days, it is not easy to install the illuminance sensor in the most suitable position, because user's needs for integration, refinement and the design or the like of a mobile terminal are increasing.

Accordingly, it is considered that the illuminance sensor is to be arranged at a position away from the user interface of the flip-type mobile terminal such as a back face of the housing or the like of the mobile terminal as shown in FIG. 13. However, if the illuminance sensor is arranged at such a position, it means that the illuminance sensor locates in a shadow area of the housing as shown in FIG. 14 when the user opens and uses the flip-type mobile terminal. Therefore, in such a case, there is a problem that the illuminance sensor cannot measure the illuminance level around the user interface correctly.

The present invention has been made based on circumstances like the above. The object of the present invention is to provide an illuminance detection method of a flip-type electronic device which can measure the illuminance level around the user interface correctly, the flip-type electronic device and a program.

Means for Solving a Problem

The first illuminance detection method of the present invention includes a first step of detecting an open operation of a flip-type electronic device having user interface located at an inner side in a closed state, and a second step of measuring illuminance level in a vicinity of an area where the user interface is exposed in an opened state of the flip-type electronic device when the open operation is detected.

The first flip-type electronic device of the present invention includes operation detection means for detecting an open operation of a flip-type electronic device having user interface located at an inner side in a closed state, and illuminance measurement means for measuring illuminance level in a vicinity of an area where the user interface exposes in an opened state of the flip-type electronic device when the open operation is detected.

The first illuminance detection program of the present invention causing a computer to execute a first step of detecting an open operation of a flip-type electronic device having user interface located at an inner side in a closed state, and a second step of measuring illuminance level in a vicinity of an area where the user interface exposes in an opened state of the flip-type electronic device when the open operation is detected.

Effect of the Invention

According to the present invention, it can obtain an effect that the illuminance level around the user interface can be measured correctly even if a flip-type electronic device is equipped with the illuminance sensor at a position that becomes to face downward or the like in an opened state.

DESCRIPTION OF THE REFERENCE NUMERALS

Figure 1A:
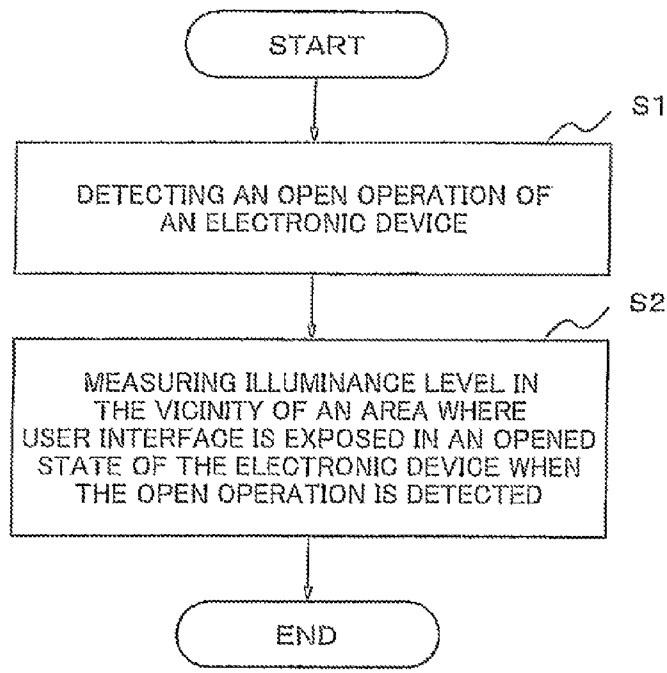
FIG. 1A is a flowchart showing an illuminance detection method of a flip-type electronic device according to the first exemplary embodiment of the present invention.

1 a lower part housing
2 an upper part housing
3 a hinge unit
4, 104 an open assist button
5 an illuminance sensor
6 a backlight
7 user interface
8 a magnetic sensor
9 a permanent magnet
10 a flip-type electronic device (a mobile terminal)
10*a* an operation detection means
10*b* an illuminance detection means
11 a controller
106 a backlight
101 CPU (Central Processing Unit)
102 a memory unit
103 an input/output interface unit

BEST MODE FOR CARRYING OUT THE INVENTION

First Exemplary Embodiment

Exemplary embodiments of an illuminance detection method of a flip-type electronic device of the present invention, the flip-type electronic device and a program will be described hereinafter.

Figure 1B:
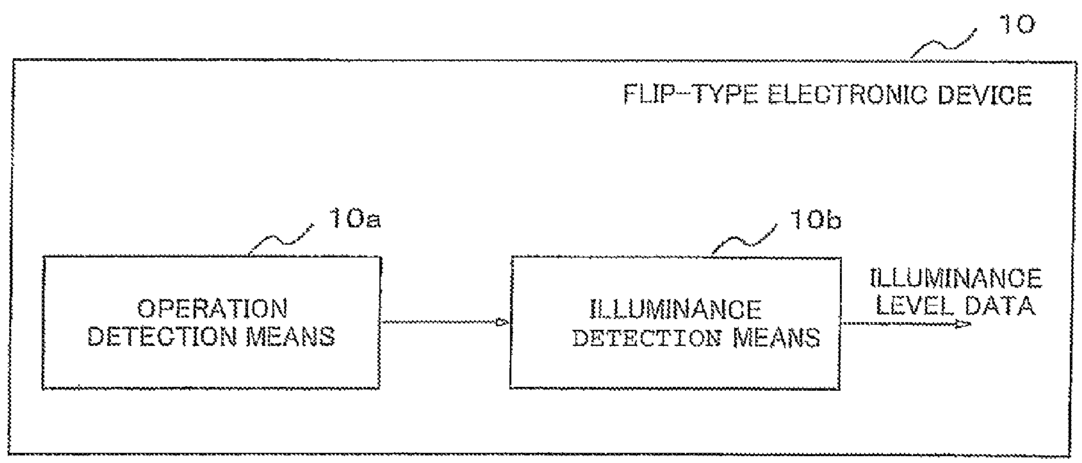
FIG. 1B is a block diagram of the flip-type electronic device according to the first exemplary embodiment of the present invention.

FIG. 1A is a flowchart showing an illuminance detection method of the flip-type electronic device 10 according to the first exemplary embodiment of the present invention. FIG. 1B is a drawing showing a block diagram of the flip-type electronic device 10.

The illuminance detection method of the flip-type electronic device of the first exemplary embodiment of the present invention includes, as shown in FIG. 1A, a first step (s1) for detecting an open operation of the flip-type electronic device, and a second step (s2) for measuring illuminance level in a vicinity of an area where the user interface of the flip-type electronic device exposes in an opened state when the open operation is detected.

The flip-type electronic device of the first exemplary embodiment of the present invention includes, as shown in FIG. 1B, an operation detection means 10*a* which detects an open operation of the flip-type electronic device, and an illuminance measurement means 10*b* which measures illuminance level in the vicinity of an area where the user interface is exposed in an opened state of the flip-type electronic device when the open operation is detected. As for more concrete configuration of the case of the flip-type electronic device, it is possible to configure a first housing and a second housing or the like being joined so that they can open and close.

As mentioned above, according to the first exemplary embodiment, the operation detection means 10*a* measures the illuminance level of the user interface side in the timing when the open operation of the flip-type electronic device is detected. By this configuration, it can obtain the effect that even if the illuminance sensor is arranged at a position that becomes to face downward or a shadow area or the like in the opened state, the illuminance sensor can measure the illuminance level around the user interface correctly.

Second Exemplary Embodiment

In the second exemplary embodiment of the present invention, it will describe about a flip-type mobile terminal having an open assist button which assists an open operation of a flip-type housing.

Figure 2:
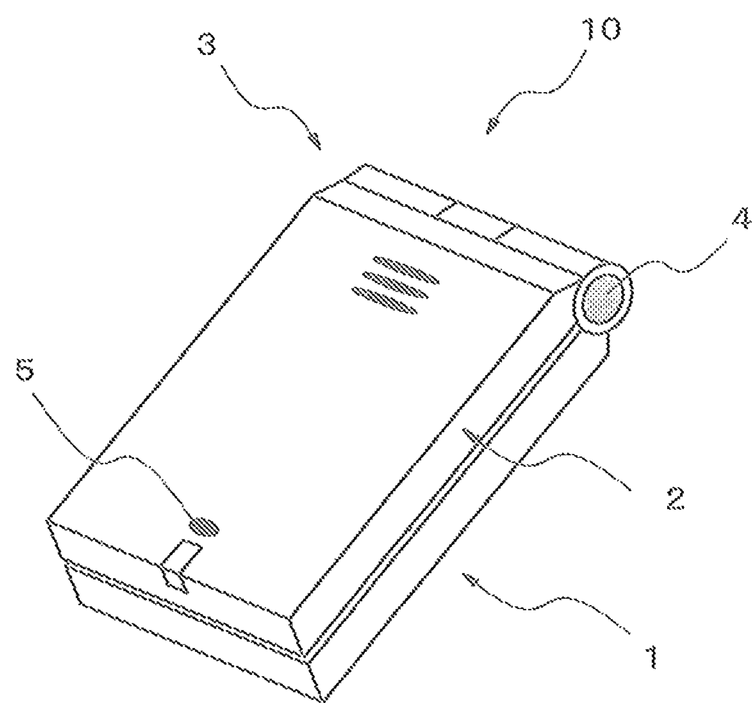
FIG. 2 is a drawing showing an external appearance of a flip-type mobile terminal in a closed state in the second exemplary embodiment of the present invention.
Figure 3:
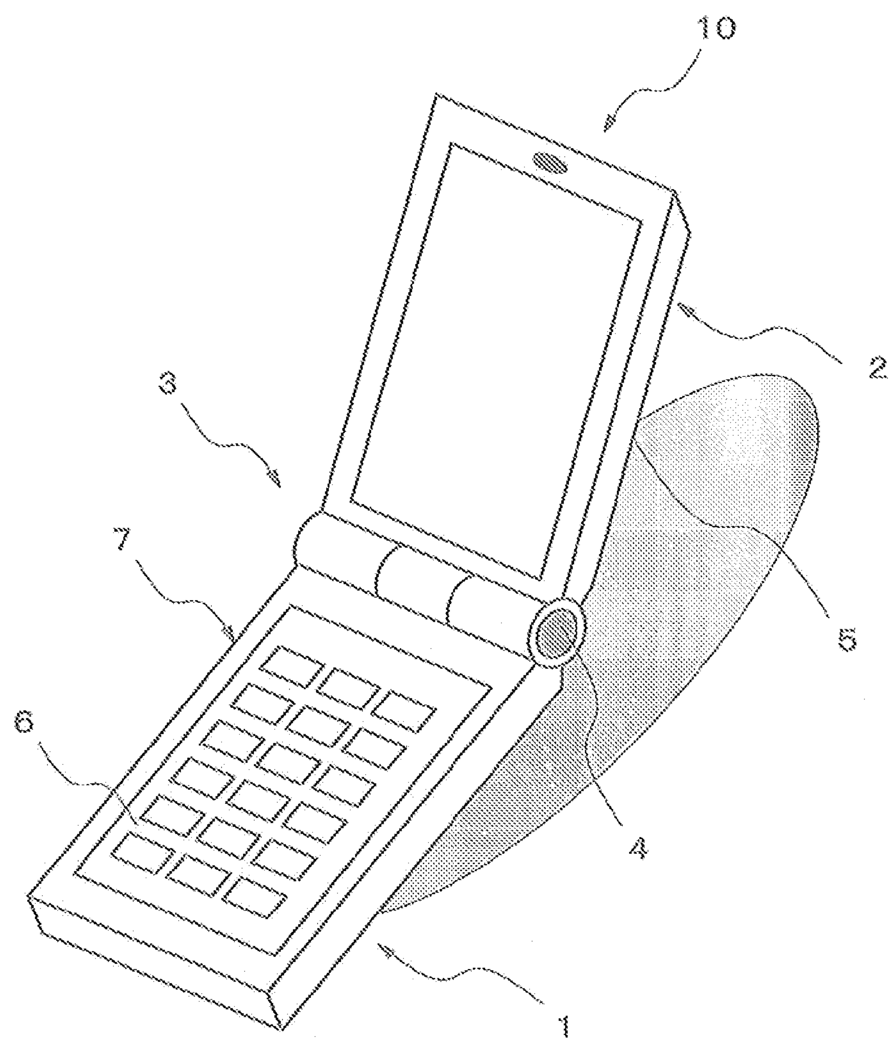
FIG. 3 is a drawing showing an external appearance of the flip-type mobile terminal in an opened state in the second exemplary embodiment of the present invention.

FIG. 2 is a drawing showing an external appearance of the flip-type mobile terminal in a closed state of the second exemplary embodiment of the present invention. FIG. 3 is a drawing showing an external appearance of the flip-type mobile terminal in the opened state.

The flip-type mobile terminal 10 of this embodiment includes a lower part housing 1 providing a key operation part having the backlight 6 and user interface 7 in which the key operation part is arranged, an upper part housing 2 providing a liquid crystal display panel or the like, and a hinge unit 3 which joins the lower part housing 1 and the upper part housing 2 as shown in FIG. 3. Further, the flip-type mobile terminal 10 provides an open assist button 4 which is installed in an edge of the hinge unit 3 and activates one touch open function for putting the lower part housing 1 and the upper part housing 2 into the opened state when being pushed down.

In other words, the hinge unit 3 of the present embodiment has a spring or the like which is built-in inside around the hinge shaft for driving the lower part housing 1 and the upper part housing 2 in the closed state to the opened state. The flip-type mobile terminal provides one touch open mechanism which puts the lower part housing 1 and the upper part housing 2 into the opened state as shown in FIG. 3 in response to pushing down the open assist button 4 by the user.

Also, the illuminance sensor 5 of this embodiment is installed at a position which is equivalent to a position of the key operation part of the lower part housing 1 of the flip-type mobile terminal as shown in FIG. 2. The illuminance sensor 5 is arranged at a position which is adjacent to an area where the user interface of the flip-type mobile terminal exposes when the upper part housing 2 is being in the opened state (for example, at the edge side or the like, opposite to the hinge unit 3, of a back face of the upper part housing 2).

Accordingly, the flip-type mobile terminal can measure the illuminance level of the ambient environment of the user interface 7 in the closed state. However, because the illuminance sensor is shadowed by a mobile terminal housing in the opened state, the flip-type mobile terminal may not be able to measure the illuminance level around the area corresponding to the user interface 7 correctly.

Figure 4:
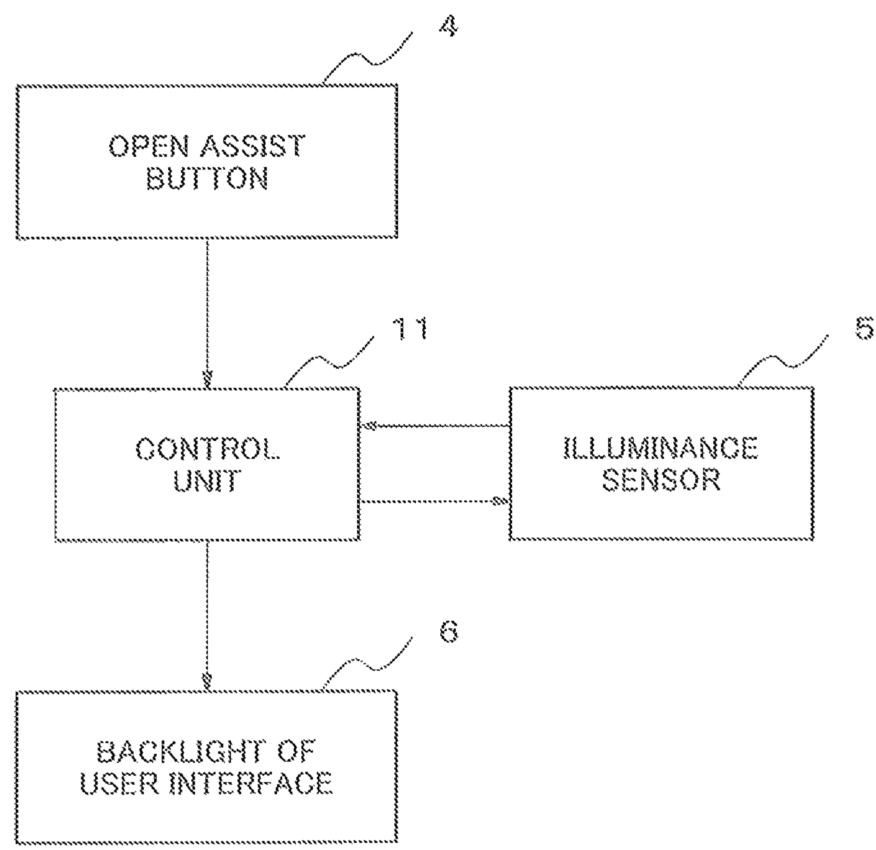
FIG. 4 is a drawing showing a configuration of a control device of the backlight in the second exemplary embodiment.

FIG. 4 is a block diagram showing a configuration of a control device of the backlight of this embodiment. It includes the open assist button 4 which assists the open operation of the flip-type mobile terminal, the illuminance sensor 5, the backlight 6 of the user interface and the controller 11. The function of each part is as follows.

The open assist button 4 provides a detection means which detects a fact that a user pushes down the button, and outputs a detection signal which indicates that the user performs an operation for changing a state of the mobile terminal to the opened state. The illuminance sensor 5 measures the ambient illuminance level, and outputs the measured illuminance level data when a readout control signal is received.

The backlight 6 illuminates keys or the like of the user interface 7 by lighting up/non-lighting up or lighting up with the luminance appropriate for a controlled value according to a control signal which controls lighting up/non-lighting up or the luminance at the time of lighting up.

The controller 11 supplies the readout control signal to the illuminance sensor 5 when the detection signal is received from the detection means of the open assist button 4. The controller 11 reads out the illuminance level data of the illuminance sensor 5, and outputs the control signal, which controls lighting up/non-lighting up and the luminance of the backlight according to the illuminance level data having been read out, to the backlight 6.

For example, the controller 11 reads out the illuminance level data from the illuminance sensor 5 when the open assist button 4 is pushed down. This illuminance level data is the data which is measured in a bright environment around the back face of the flip-type mobile terminal 10 before beginning the open operation of the lower part housing 1 and the upper part housing 2, or at the time of beginning the open operation. The controller 11 controls lighting up/non-lighting up of the backlight 6 of the user interface or controls the lighting with the most suitable luminance according to the illuminance level data having been read out, that is, brightness of the ambient environment.

Next, operation of the second exemplary embodiment of the present invention will be described in detail.

Figure 5:
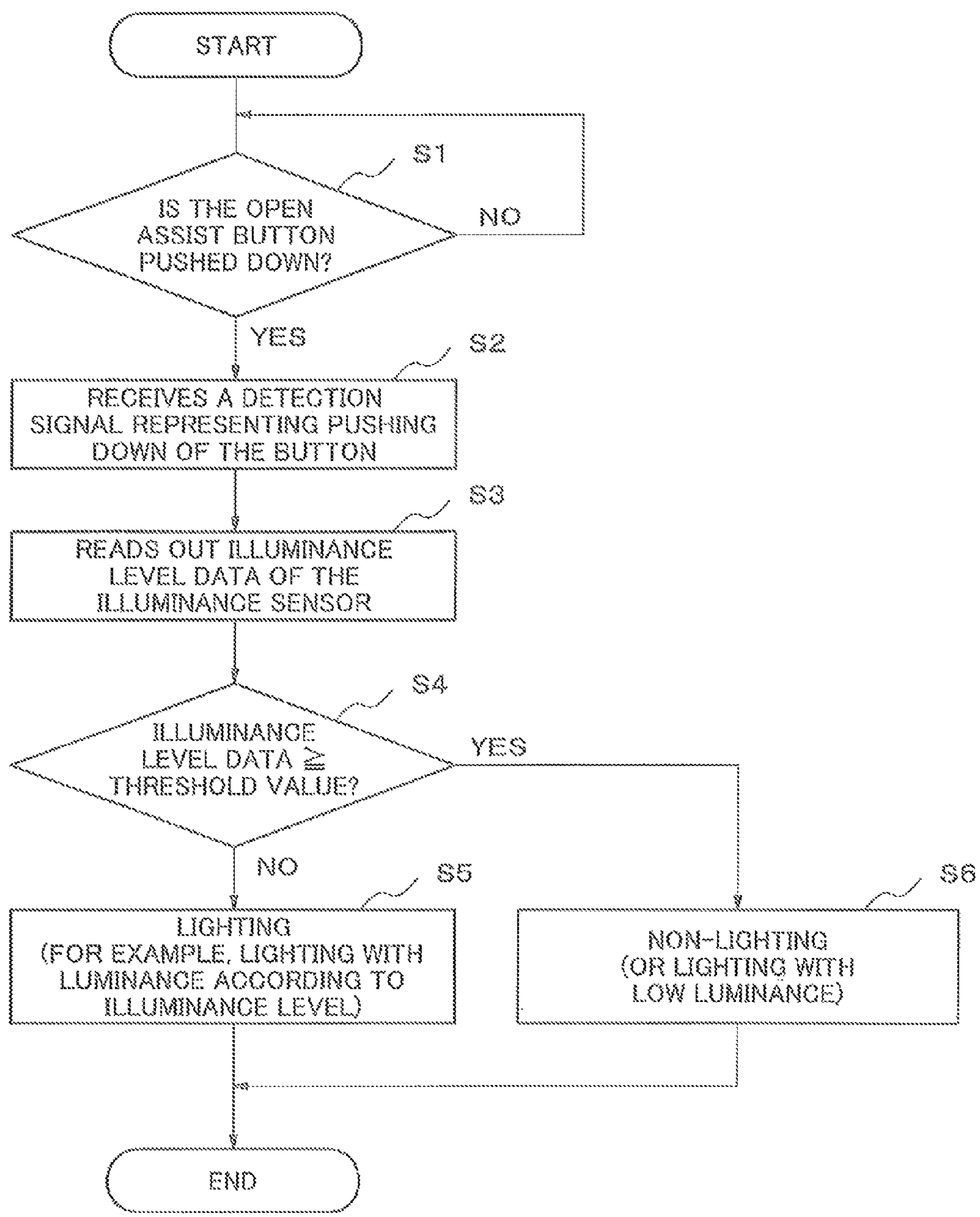
FIG. 5 is a drawing showing a flowchart of operation processing in the second exemplary embodiment.

FIG. 5 is a drawing showing a flowchart of operation processing in the second exemplary embodiment. Hereinafter, operation of this embodiment will be described with reference to FIGS. 2-5.

In order to put the flip-type mobile terminal 10 from the closed state shown in FIG. 2 into the opened state shown in FIG. 3, a user pushes down the open assist button 4. When the detection means of the open assist button 4 detects the fact that the open assist button 4 is pushed down (S1), the detection means transmits a detection signal to the controller 11 (S2) before the mobile terminal has changed to the opened state. When the controller 11 receives the detection signal, it supplies a readout control signal for reading out illuminance level to the illuminance sensor 5, and reads out the illuminance level data before changing to the opened state (at the time of detection of the open operation) from the illuminance sensor 5 (S3).

Next, the controller 11 compares the illuminance level data having been read out with the threshold value that determines whether the backlight is to be lit or not (S4). When the illuminance level data is less than the threshold value, the controller 11 lights the backlight 6 (S5). When the illuminance level data is no smaller than the threshold value, the controller 11 does not light the backlight 6 (S6).

Further, the controller 11 can control the luminance of the backlight 6 which is lit at Step S5 according to the illuminance level of the illuminance level data. For example, providing a plurality of threshold values larger than the threshold value, and the controller 11 may light the backlight 6 so that the luminance of the backlight 6 may be inversely proportional to the brightness of ambient environment according to the condition whether or not the illuminance level data falls within the range between which threshold values.

As described above, according to the second exemplary embodiment, the flip-type mobile terminal 10 automatically controls lighting up/non-lighting up or the luminance of lighting of the backlight according to the brightness around the illuminance sensor before changing to the opened state. By this configuration, it can obtain the effect that power consumption due to unnecessary lighting or luminance of the backlight can be suppressed, and also the most suitable luminance according to the brightness of ambient environment can be applied for lighting. Also, because the illuminance sensor measures the illuminance level only at the time of the open operation of the flip-type housing, the power consumption can be suppressed further.

Third Exemplary Embodiment

Although it has indicated the configuration, according to the above-mentioned embodiment, which detects a timing before changing the flip-type mobile terminal from the closed state to the opened state by detecting operation of the open assist button, it is not limited to this configuration.

For example, the flip-type mobile terminal may be configured that it detects the operation of a flip-type housing by a user operation from the closed state to the opened state by a moving distance between the lower part housing 1 and the upper part housing 2, or an opening angle or the like at the timing before changing the mobile terminal to the opened state.

Figure 6:
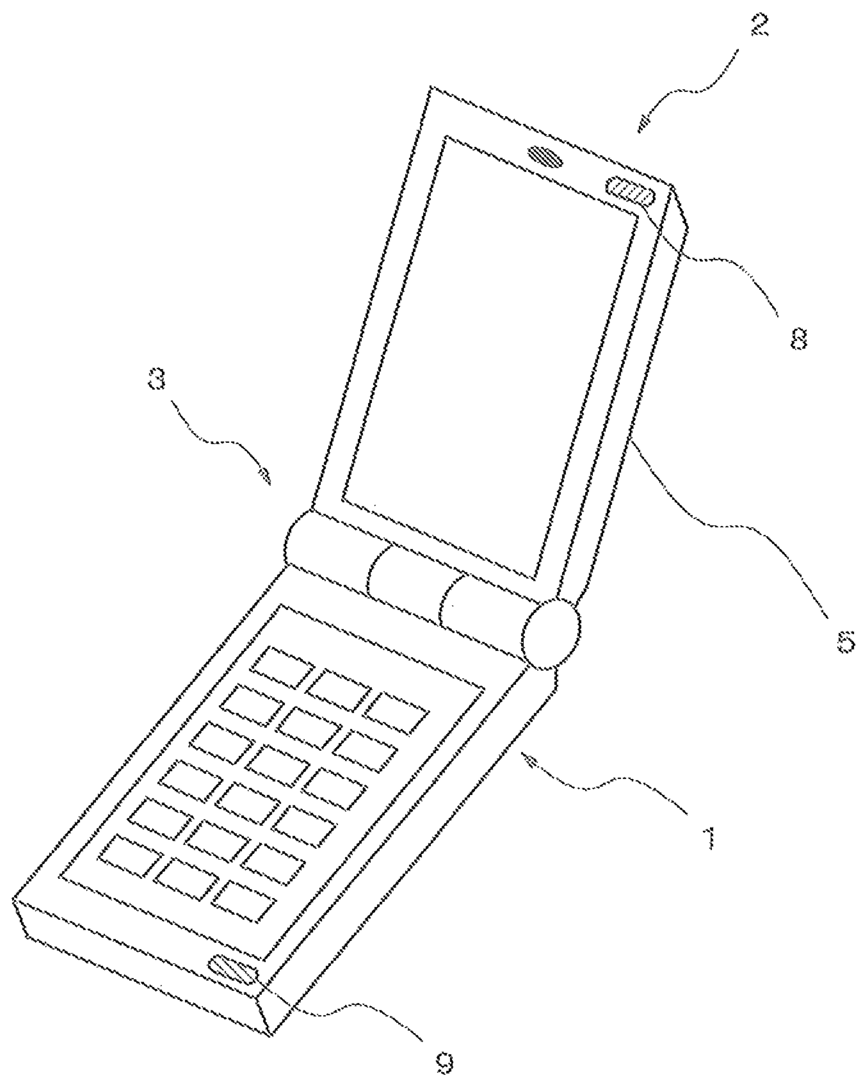
FIG. 6 is a drawing showing a configuration example of the flip-type mobile terminal of the third exemplary embodiment of the present invention.

FIG. 6 is a drawing showing the configuration of the flip-type mobile terminal of the third exemplary embodiment of the present invention. This flip-type mobile terminal is equipped with a magnet 9 inside the upper part (the lower part) housing edge or the like. And a magnetic sensor 8 using a hall element or the like is equipped at a position corresponding to the magnet 9 in the lower part (the upper part) housing edge of this flip-type mobile terminal. The mobile terminal is constituted so that the magnetic sensor 8 may detect an initial transition of the upper and lower housings from the closed state to the opened state, it may output a timing signal before changing to the opened state, and it may measure illuminance level of the illuminance sensor at the back face of the housing.

As a detection sensor which detects the initial transition of the upper and lower housings from the closed state to the opened state, it may use other distance sensors instead of the magnetic sensor, and a mechanical sensor or an optical sensor or the like may also be used.

Figure 7:
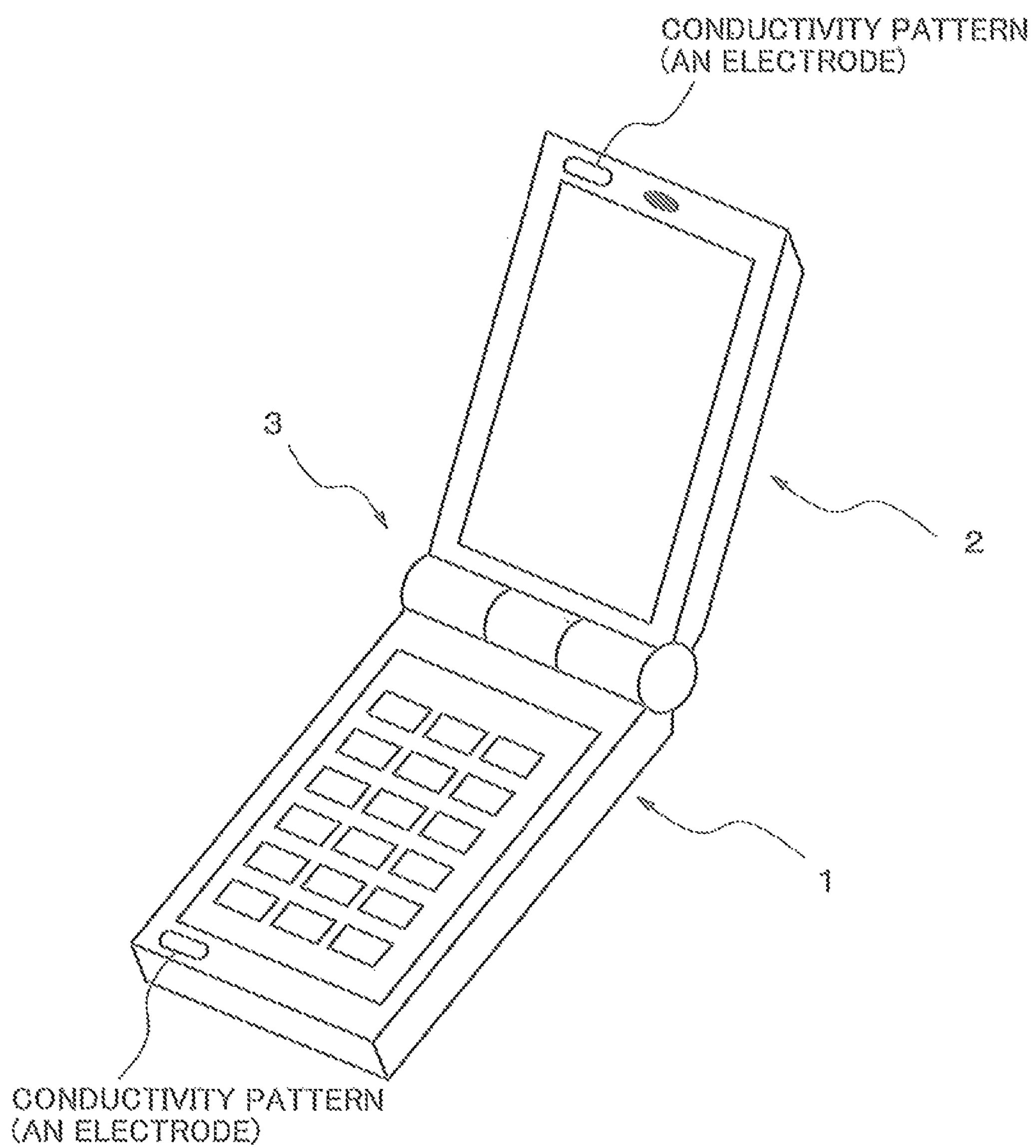
FIG. 7 is a drawing showing an example using a distance sensor as a detection sensor which detects an initial transition from a closed state to an opened state of the upper and lower housings.

FIG. 7 is a drawing showing a mobile terminal equipped with a distance sensor as a detection sensor which detects the initial transition from the closed state to the opened state of the upper and lower housings. The mobile terminal is equipped with the distance sensor which includes a conductive pattern (an electrode) on each of the upper and lower housings opposing in the closed state, and detects the distance of the upper and lower housings by change of capacitance between the conductive patterns. The conductive pattern has insulating material on the surface. The mobile terminal detects the initial transition of the upper and lower housings from the closed state to the opened state by the conductive pattern and the distance sensor.

Figure 8:
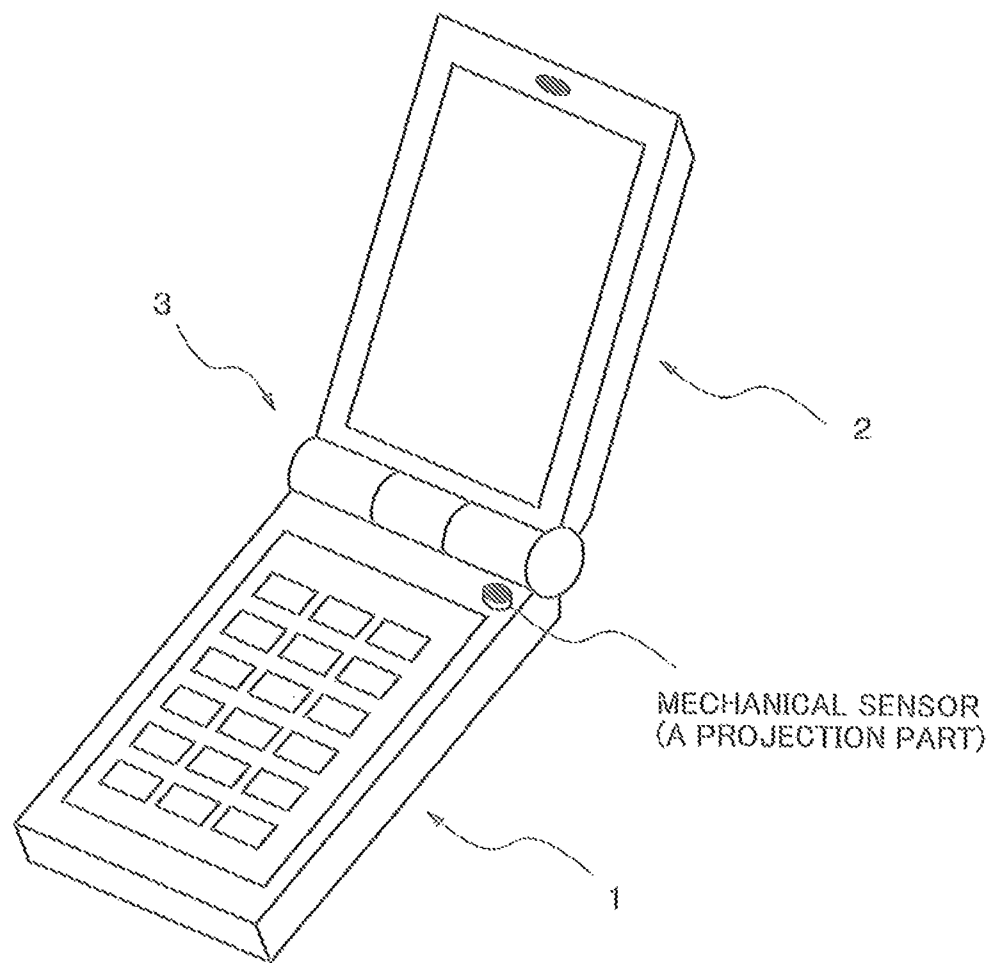
FIG. 8 is an example using a mechanical sensor as a detection sensor which detects an initial transition from a closed state to an opened state of the upper and lower housings.

FIG. 8 is a drawing showing a mobile terminal equipped with a mechanical sensor as a detection sensor which detects the initial transition from the closed state to the opened state of the upper and lower housings. The mobile terminal is equipped with the mechanical sensor which includes a projection part or the like in either of the upper and lower housings for opening and closing a switch in the housing. The mobile terminal detects the initial transition of the upper and lower housings from the closed state to the opened state by letting the projection part or the like move by opening and closing of the upper and lower housings.

Figure 9:
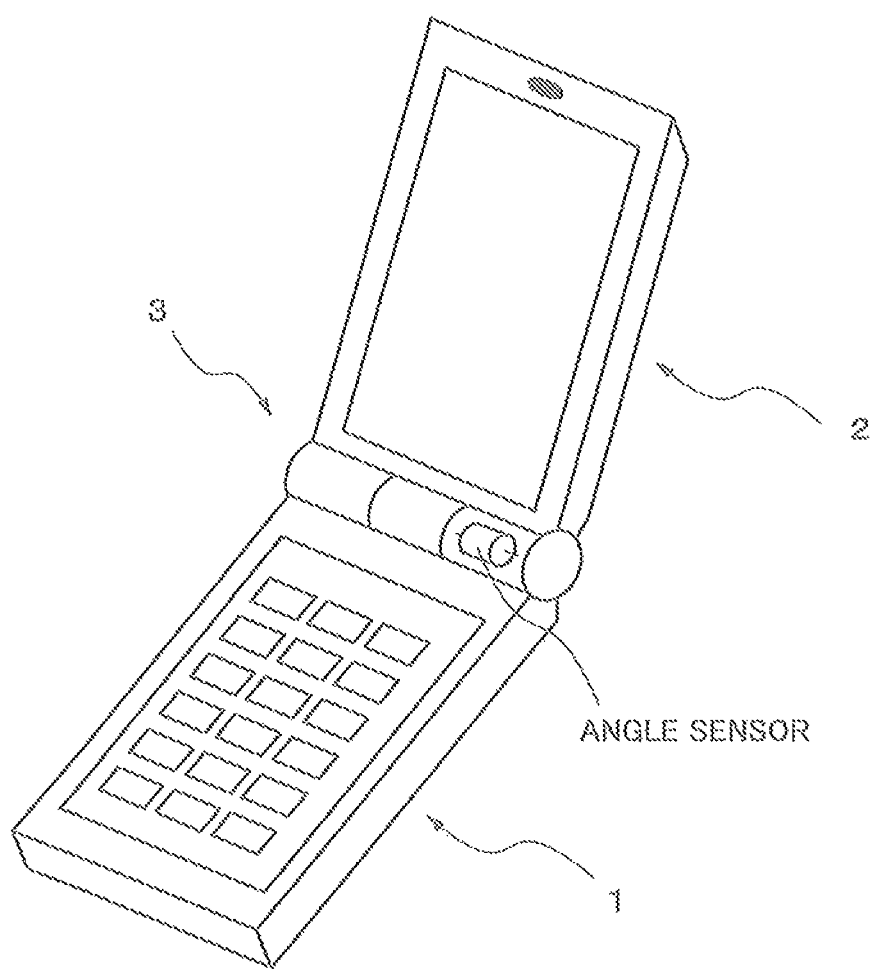
FIG. 9 is an example using a mechanical angle sensor as a detection sensor which detects an initial transition from a closed state to an opened state of the upper and lower housings.

FIG. 9 is a drawing showing a mobile terminal equipped with a mechanical angle sensor as a detection sensor which detects the initial transition from the closed state to the opened state of the upper and lower housings. The mobile terminal is equipped with an angle sensor which can detect an angle of rotation of the upper and lower housings at a hinge shaft of the hinge unit. The mobile terminal detects the initial transition of the upper and lower housings from the closed state to the opened state by the angle sensor detecting the angle of rotation of the upper and lower housings.

Figure 10:
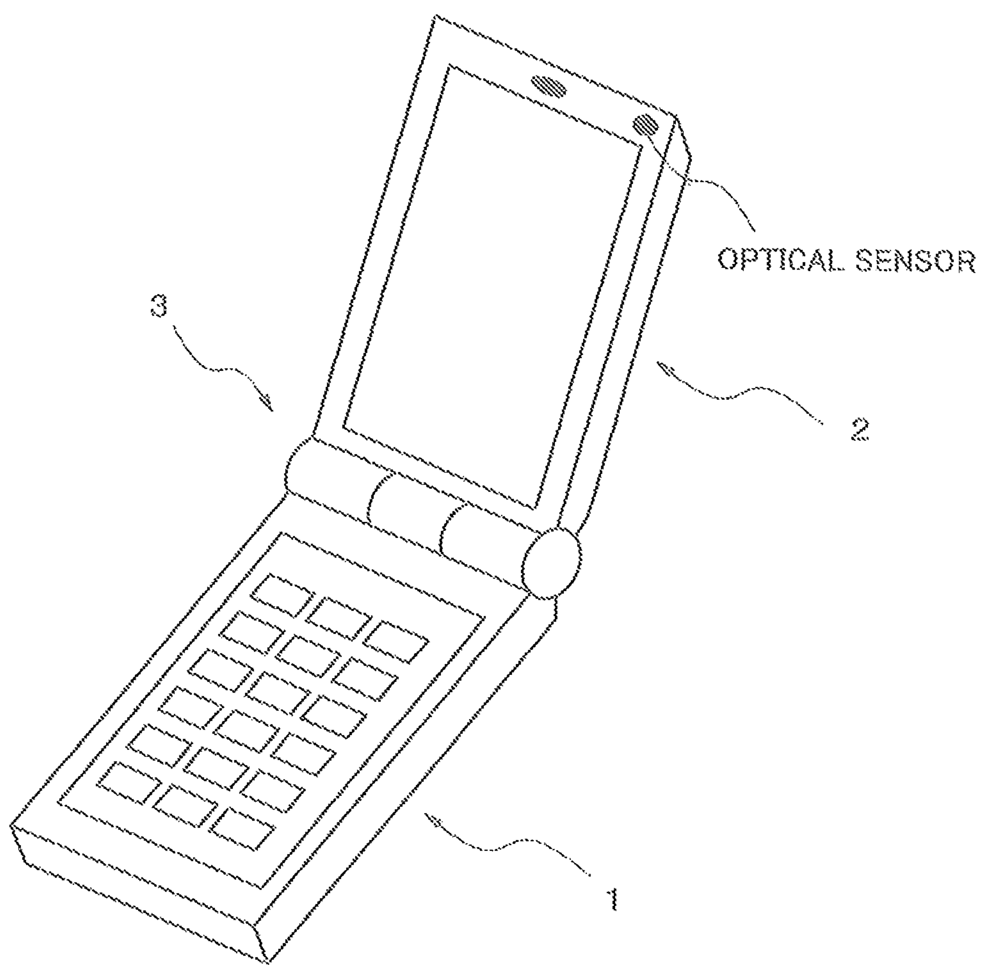
FIG. 10 is an example using an optical sensor as a detection sensor which detects an initial transition from a closed state to an opened state of the upper and lower housings.

FIG. 10 is a drawing showing a mobile terminal equipped with an optical sensor as a detection sensor which detects the initial transition from the closed state to the opened state of the upper and lower housings. The mobile terminal is equipped with the optical sensor at one of the upper and lower housings for detecting the presence of light. The mobile terminal detects the initial transition of the upper and lower housings from the closed state to the opened state by the presence of light by opening and closing of the upper and lower housings.

Other Exemplary Embodiment

In the above mentioned embodiments, it has described a backlight of the key operation part or the like as a backlight of the user interface. However, the present invention is applicable in control of a backlight of other user interface. For example, it is apparent that it is applicable in control of a backlight of a liquid crystal display panel in a display unit of the mobile terminal, and also control of both backlight of the backlight of the key operation part or the like and a liquid crystal display panel.

Moreover, processing of each embodiment mentioned above can cause hardware to perform a series of processing, and also it can cause software to execute. When it causes software to execute, the mobile terminal provides a memory part storing program codes of the software which realizes the function of each embodiment mentioned above. A computer (CPU (Central Processing Unit)) of the mobile terminal realizes each function mentioned above by retrieving and executing the program codes.

Also, the mobile terminal can retrieve the program codes from a storage medium which is storing the program codes, and store in the memory part. In this case, the program codes retrieved from the storage medium realize the function of each embodiment mentioned above.

Figure 11:
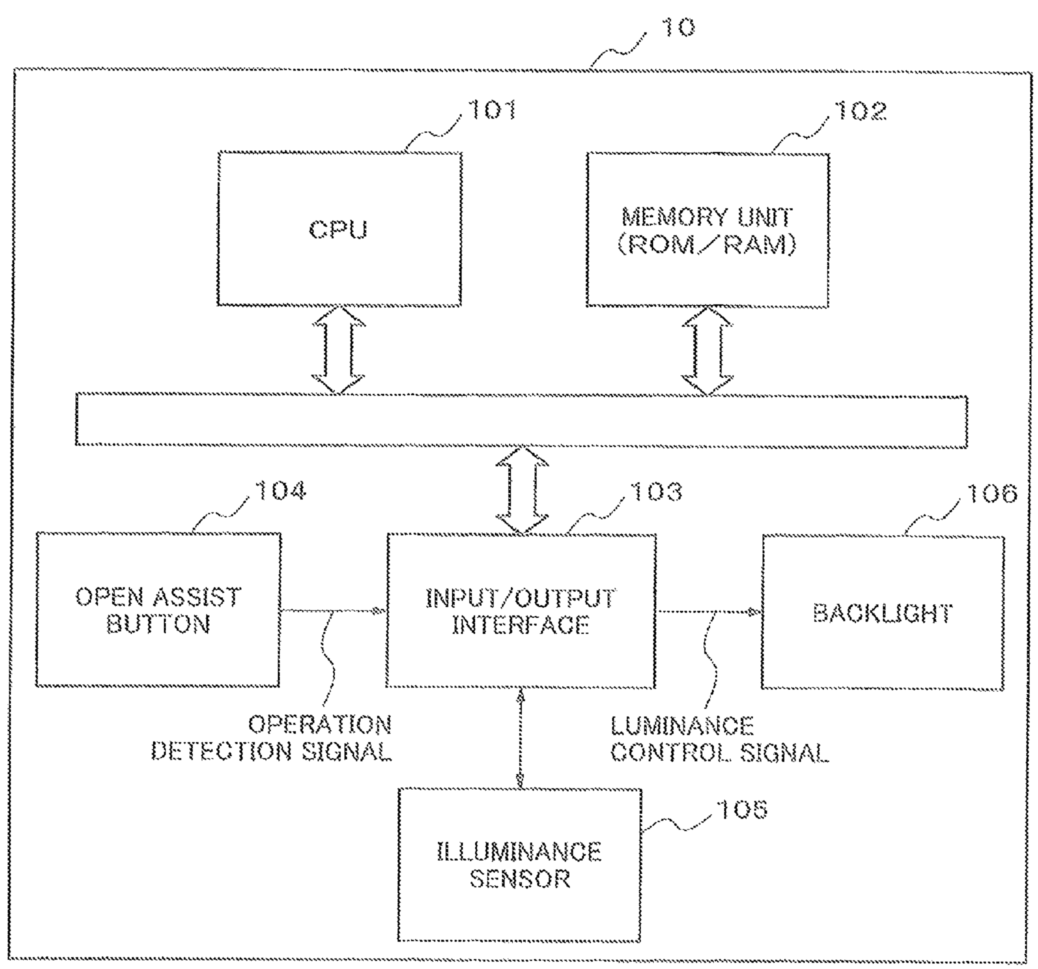
FIG. 11 is a drawing showing the other embodiment that performs processing of the flip-type electronic device of the present invention by a program.

FIG. 11 is a drawing showing an embodiment that performs processing of the flip-type electronic device of the present invention by a program.

The flip-type electronic device 10 includes CPU 101 which is mutually connected by a bus and constitutes a computer, and a memory unit 102 including ROM (Read Only Memory) and RAM (Random Access Memory) or the like. Also, the flip-type electronic device 10 includes input/output interface 103, an open assist button 104 which is connected to the CPU 101 via the input/output interface 103, an illuminance sensor 105 and a backlight 106 or the like.

In the memory unit 102, various programs including control programs of the above mentioned embodiments are stored. The CPU 101 retrieves a program of the memory unit 102, and is controlled by the retrieved program. That is, the CPU 101 controls illuminance level measurement of the illuminance sensor 105 according to an operation detecting signal of the open assist button before opening the flip-type electronic device 10 inputted from the input/output interface 103. And, the CPU 101 generates a control signal of luminance or the like based on the measured illuminance level data, and executes the processing mentioned above which controls the backlight 106.

As mentioned above, the present invention measures the illuminance level around the user interface correctly by detecting user's open operation of the electronic device, and measuring the illuminance level at the time of the open operation.

Specifically, the flip-type electronic device detects the timing which is just before the user opens the flip-type electronic device, by using the function such as the one touch open function using the open assist button or the like which assists opening and closing. And, this electronic device enables the correct illuminance level to be readout by controlling so that illuminance level may be measured at the timing.

Figure 12:
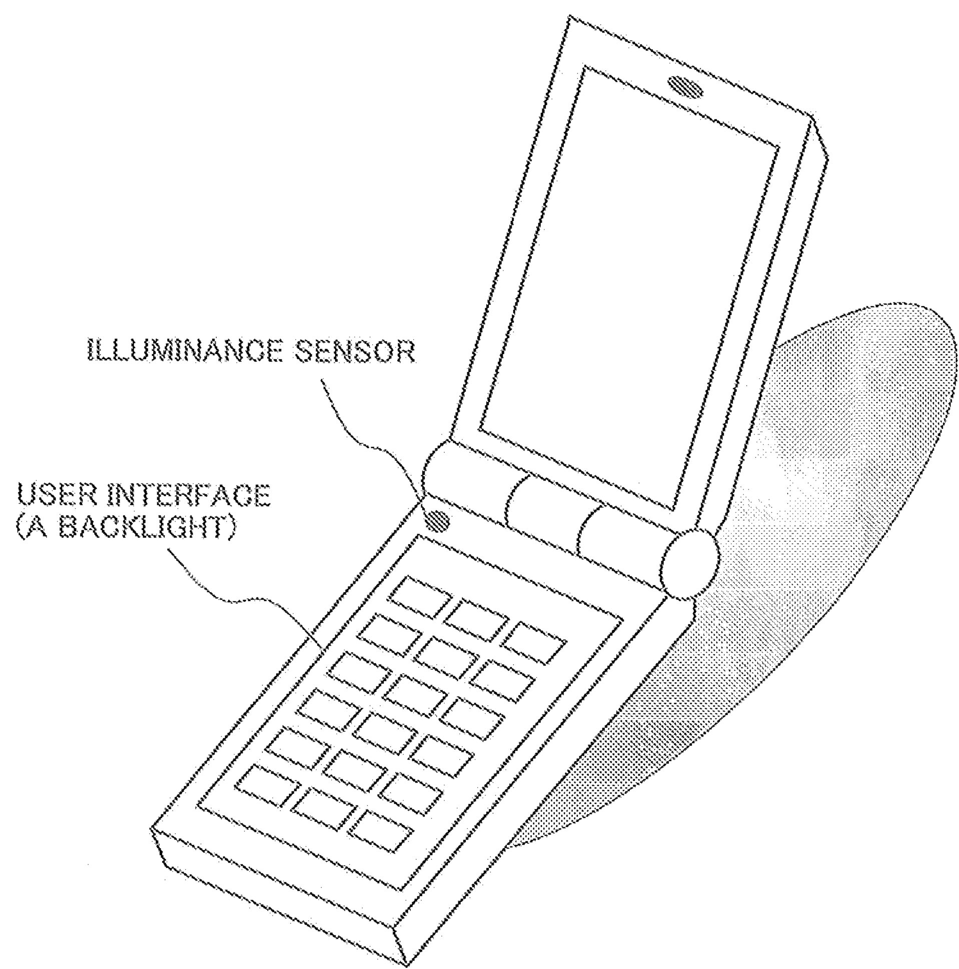
FIG. 12 is a drawing showing a configuration example of the flip-type electronic device of related art of the present invention.
Figure 13:
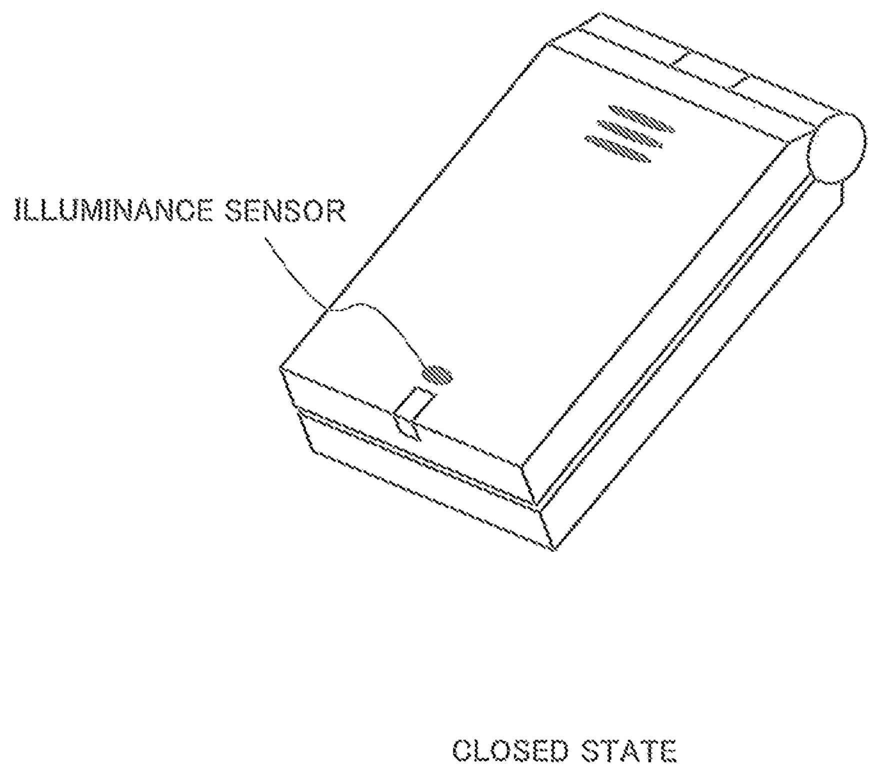
FIG. 13 is a drawing showing an example in a closed state of other flip-type electronic device.
Figure 14:
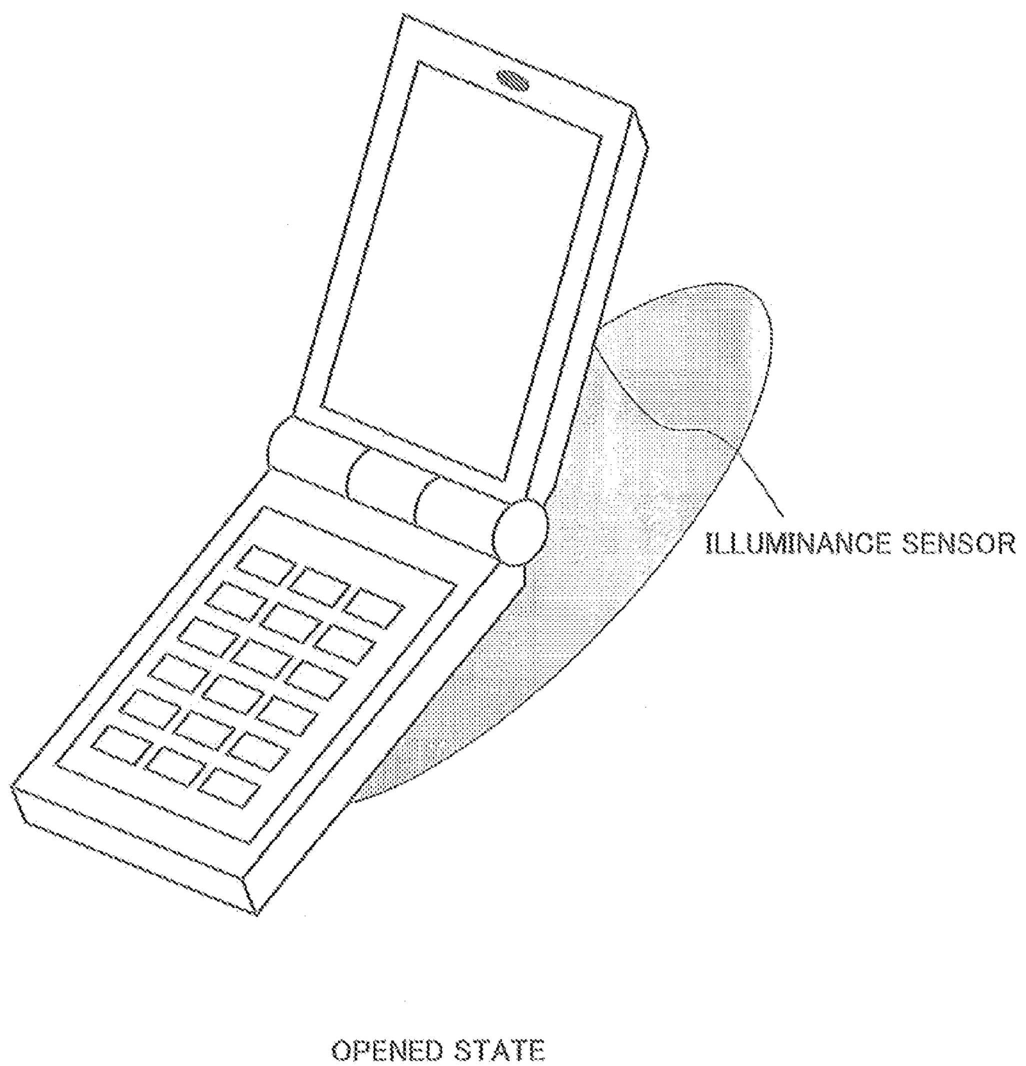
FIG. 14 is a drawing showing an example in an opened state of other flip-type electronic device.

In the present invention, the flip-type electronic device can read out the illuminance level before opened or while being opened process. For this reason, according to the present invention, as shown in FIGS. 3 and 12, the illuminance level measurement which is equivalent to the illuminance level measurement around the user interface in the state that the electronic device is being opened can be performed. Accordingly, even if the illuminance sensor is arranged at the position shown in FIG. 3, the electronic device can measure the illuminance level of the user interface correctly.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention.

Field Of Industrial Application

This invention can be applied to a flip-type mobile telephone terminal.

The invention claimed is:

1. An illuminance detection method comprising:

detecting an open operation of a flip-type electronic device including:

a first housing having user interface located at an inner side in a closed state;

a second housing engaged with the first housing so that the second housing may oppose the user interface and freely open and close; and an illuminance sensor installed at an outside of the flip-type electronic device when the second housing is in a closed state;

measuring illuminance level in a vicinity of an area when an open operation of the flip-type electronic device is detected at a start of the open operation being performed, such that the flip-type electronic device was previously closed immediately prior to detection of the open operation being started, and such that the illuminance level is measured before the open operation has been completed, in that the illuminance level is measured as the flip-type electronic device is beginning to be opened but has not yet been completely opened; and controlling a backlight of the user interface based on the illuminance level measured in the measuring by comparing the illuminance level to a threshold, and turning on the backlight when the illuminance level is less than the threshold.

2. The illuminance detection method according to claim 1, wherein the flip-type electronic device includes a first housing having the user interface, and a second housing which is engaged with the first housing so that it may oppose to the user interface and freely open and close.

3. The illuminance detection method according to claim 1, wherein, in the detecting the open operation, pushing down, which makes the flip-type electronic device from a closes state to an opened state, an open assist button is detected as the open operation of the flip-type electronic device.

4. The illuminance detection method according to claim 1, wherein, in the detecting the open operation, the open operation of the flip-type electronic device is detected by means of a magnetic, a mechanical or an optical sensor which detects an initial transition from the closed state to the opened state of the flip-type electronic device.

5. The illuminance detection method according to claim 1, wherein the flip-type electronic device is a mobile telephone terminal.

6. A flip-type electronic device comprising:

an operation detection unit that detects an open operation of a flip-type electronic device including:

a first housing having user interface located at an inner side in a closed state;

a second housing engaged with the first housing so that the second housing may oppose the user interface and freely open and close; and an illuminance sensor installed at an outside of the flip-type electronic device when the second housing is in a closed state;

an illuminance measurement unit that measures illuminance level in a vicinity of an area when an open operation of the flip-type electronic device is detected at a start of the open operation being performed, such that the flip-type electronic device was previously closed immediately prior to detection of the open operation being started, and such that the illuminance level is measured before the open operation has been completed, in that the illuminance level is measured as the flip-type electronic device is beginning to be opened but has not yet been completely opened; and a control unit that controls a backlight of the user interface based on the illuminance level measured in the measuring, comparing the illuminance level to a threshold, and turning on the backlight when the illuminance level is less than the threshold.

7. The flip-type electronic device according to claim 6, further comprising:

a first housing having the user interface; and a second housing which is engaged with the first housing so that it may oppose to the user interface and freely open and close.

8. The flip-type electronic device according to claim 6, wherein the operation detection unit detects that an open assist button, which makes the flip-type electronic device from a closes state to an opened state, is pushed down as the open operation of the flip-type electronic device.

9. The flip-type electronic device according to claim 6, wherein the operation detection unit detects the open operation of the flip-type electronic device by means of a magnetic, a mechanical or an optical sensor which detects an initial transition from the closed state to the opened state of the flip-type electronic device.

10. The flip-type electronic device according to claim 6, wherein the flip-type electronic device is a mobile telephone terminal.

11. A non-transitory computer-readable storage medium which stores an illuminance detection program causing a computer to execute:

a detecting function that detects an open operation of a flip-type electronic device including:

a first housing having user interface located at an inner side in a closed state;

a second housing engaged with the first housing so that the second housing may oppose the user interface and freely open and close; and an illuminance sensor installed at an outside of the flip-type electronic device when the second housing is in a closed state; and a measuring function that measures illuminance level in a vicinity of an area when an open operation of the flip-type electronic device is detected at a start of the open operation being performed, such that the flip-type electronic device was previously closed immediately prior to detection of the open operation being started, and such that the illuminance level is measured before the open operation has been completed, in that the illuminance level is measured as the flip-type electronic device is beginning to be opened but has not yet been completely opened; and a controlling function that controls a backlight of the user interface based on the illuminance level measured in the measuring, by comparing the illuminance level to a threshold, and turning on the backlight when the illuminance level is less than the threshold.

12. The non-transitory computer-readable storage medium which stores illuminance detection program according to claim 11, wherein the flip-type electronic device includes a first housing having the user interface, and a second housing which is engaged with the first housing so that it may oppose to the user interface and freely open and close.

13. The non-transitory computer-readable storage medium which stores illuminance detection program according to claim 11, wherein, the detecting function detects pushing down an open assist button, which makes the flip-type electronic device from a closes state to an opened state as the open operation of the flip-type electronic device.

14. The non-transitory computer-readable storage medium which stores illuminance detection program according to claim 11, wherein, the detecting function detects the open operation of the flip-type electronic device by means of a magnetic, a mechanical or an optical sensor which detects an initial transition from the closed state to the opened state of the flip-type electronic device.

* * * * *